Oct. 8, 1935.  R. THOMAS  2,016,692
ILLUMINATING SYSTEM FOR PROJECTING MOTION PICTURES IN COLOR
Filed July 9, 1934
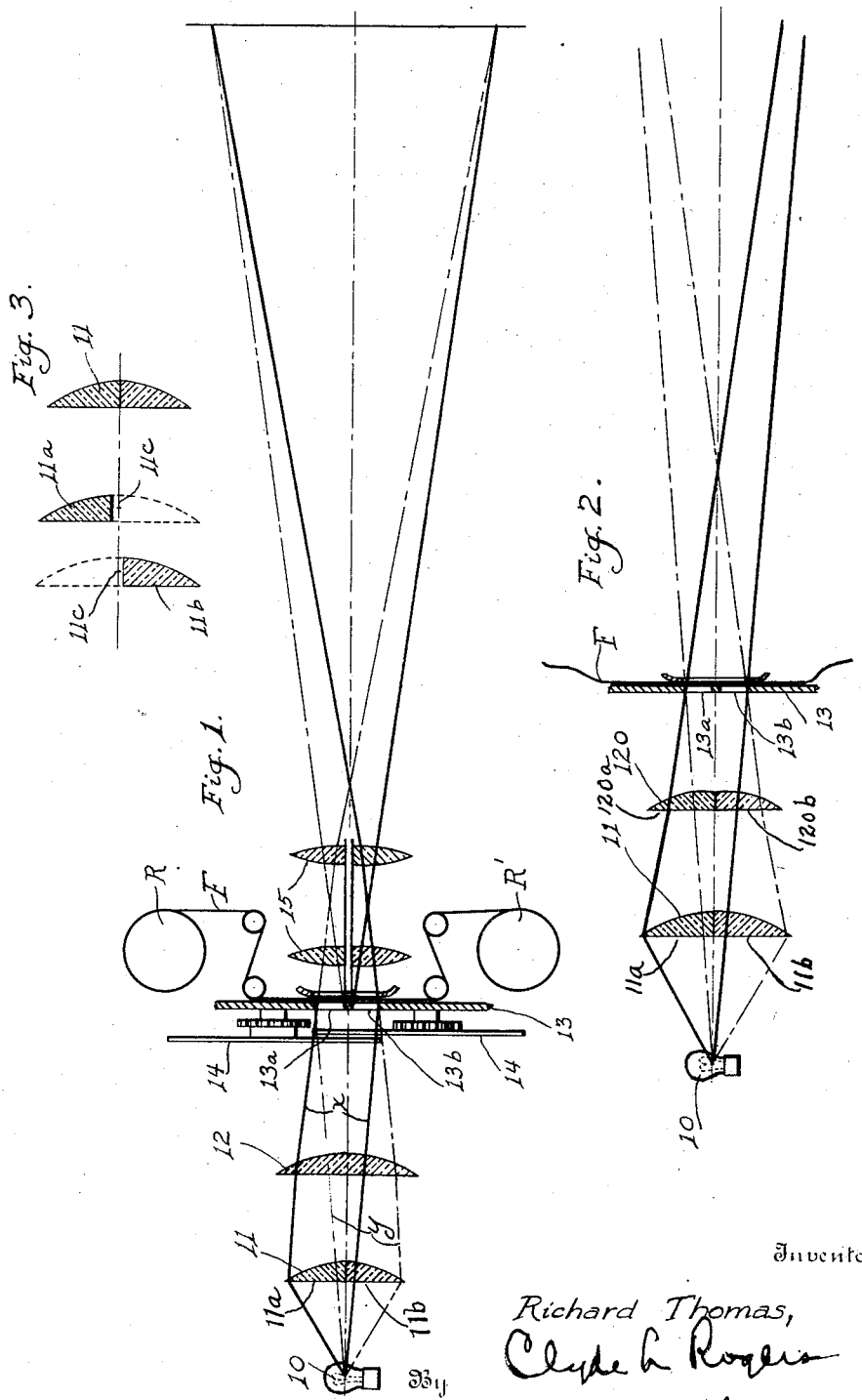
Inventor
Richard Thomas,
Clyde L. Rogers
his Attorney Patented Oct. 8, 1935

2,016,692

UNITED STATES PATENT OFFICE 2,016,692

ILLUMINATING SYSTEM FOR PROJECTING MOTION PICTURES IN COLOR

Richard Thomas, Los Angeles, Calif., assignor of one-half to William Jennings Bryan, Jr., Los Angeles, Calif.

Application July 9, 1934, Serial No. 734,360

7 Claims. (Cl. 88—16.4)

This invention relates to the art of projecting colored photographic images and relates particularly to that system of additive color in which multiple images of different color values are simultaneously projected in super-imposed relation upon a screen and there colored light corresponding to the color values of each positive image is employed in the projection thereof with the result that natural color effects are produced. Such an additive system provides a projector having a light source, a condenser system to gather the light and project the same through the images of adjacent frames of the color value film and by means of a compound lens simultaneously project the images from these two frames upon a screen in superimposed relationship, and further provides means for changing the color characteristics of the projected light by means of color filters to correspond with the color values of the frames in projection.

Customarily the color values upon one of the two frames is registered upon the film by the exposure of that frame through a red filter and the color values registered upon that frame are the red color values in the objective field. In like manner, the color value images upon the other of the two frames is registered upon the film by the exposure of that frame through a green filter and the color values registered upon that frame are the green color values in the objective field. When such a film is projected in such a projector system and the light passing through the red color value frame is likewise projected through a red filter and the green color value image is simultaneously projected through a green filter, and the resultant red and green images are super-imposed to form a single composite image upon the screen, such composite * * * image is neither red nor green but is portrayed in the natural color effect.

In such a system I have found that it is essential for the production of natural color over the entire area of the screen image that the light intensity be equal upon all parts of the screen image. In order to attain this result, I have found it necessary to develop an entirely new technique in the art of screen illumination through a projector. It has been necessary to change radically the conception of the functions of the condenser system heretofore used to effect screen illumination in all systems of projection where a single film area aperture is used and a single picture is projected upon the screen.

This is apparent from an analysis of the different principles and technique involved in the two systems.

Let us consider first the projection of a single picture area. In such case the light from any given light source is passed through lenticular condensers and through a single aperture plate of a size to correspond with the size of the film area used. The film image is thus projected through the projector lens to the screen stationed before the projector. The purpose of the condenser in such a system is to gather the maximum light rays from the light source and to condense them into an area which at the aperture plate approximates the area of the aperture to be covered. Such a condenser transmits a cone of light along the optical axis of the condenser which at the aperture plate has a cross-section at least equal to the area of the film aperture. In such a system the maximum luminosity is along the optical axis of the condenser or along the principal rays passing through the center of the cone of light and the center of the film aperture. Thus, in the image projected upon the screen the maximum luminosity is in the center of the screen image and the luminosity decreases from the center to the outer edges of the image.

This variation of luminosity between the centers and the edges of the screen image is not objectionable where the picture is projected in black-and-white and through a single aperture only. However, this variation of luminosity becomes very objectionable where additive color is used and especially where two or more pictures are projected in super-imposed relationship upon the screen.

When two pictures are projected and a double aperture plate is used and the two images projected therethrough are super-imposed to form a composite image upon the screen, an entirely new technique of illumination must be used. This is due to the fact that where such a system is used the dividing wall in the middle of the double aperture plate separates the plate into two film areas and where, for example, the double areas are vertically disposed, the bottom of the upper picture is projected at the bottom of the screen image, while the top of the lower picture is projected to the top of the screen image, although both the bottom of the upper picture and the top of the lower picture are in the center of the double aperture and the area of greatest luminosity.

If the conventional type of condenser is used for such a purpose, the cone of light passing from the condenser must be spread to cover the area of the double aperture plate. This spreading of the light to cover the two apertures still leaves the center of the luminosity along the optical axis of the condenser, i. e., along the principal ray passing through the center of the cone of light and the center of the double aperture plate. However, in this system, the center of the aperture plate no longer corresponds to the center of the screen image, for inasmuch as the top and bottom image are super-imposed to form a composite image upon the screen, the bottom of the top film image is projected at the bottom of the screen while the top of the bottom film image (which is also in the center of the aperture plate) is projected at the top of the screen image. It will be seen that for this reason the center of the greatest luminosity which is at the dividing wall of the aperture plate is not projected to the center of the screen image, but instead is projected to the top and to the bottom of the screen image.
Similarly the areas of lesser luminosity in the top and bottom of the aperture plate are projected to the center of the screen image. Thus, instead of having—as where a single aperture is used—a screen image with its greatest luminosity in the center and gradually diminishing luminosity to the edges of the picture, the greatest luminosity is at the opposite edges of the screen and the point of least luminosity is in its center. This variation in the luminosity of the screen image is extremely objectionable in an additive system of color.

It must be remembered that one of the film images carries green color values and is projected through a green filter, while the other film image carries red color values and is projected through a red filter. The color upon the screen image is created by the light passing through the color value images, thence through the filters and thence upon the screen, and the more intense the light passing through the image or portions of the image, the more brilliant and intense is the color.

For this reason the conventional condenser system produces a composite image in which the central portion only is in natural color and on one edge of which the red color predominates and is more brilliant, while on the opposite edge a green color is predominant and more brilliant. This gives to every such picture the effect of having a red band of color on one edge and a green band of color on the opposite, and greatly detracts from the beauty and the naturalness of the picture. This condition also tends to produce a color beat or pulsating of these two bands of predominate color at opposite edges of the screen picture.

I have found that the only way in which this objectionable separation of color or over-emphasis of color and beat can be eliminated is by so designing and constructing a condenser system that it will give an even luminosity over the entire area of the double aperture plate and it is the principal object of my invention to provide means for creating an even distribution of light and an equal luminosity throughout both of the film areas defined by such double aperture plate. A further object is to provide a novel construction of lens adapted for use in such a condenser system. The invention further comprises a novel method of attaining an even distribution of light of equal intensity throughout the film areas defined by a double aperture plate for use in additive color projection.

The foregoing and other objects and advantages of the invention will be better understood from the following detailed description, and the distinctive features of novelty will be thereafter pointed out in the appended claims.

Referring to the drawing:

Figure 1 is a diagrammatic view partly in elevation and partly in section showing an apparatus embodying the invention;

Figure 2 is a diagrammatic view showing a modified form of the invention; and

Figure 3 is a diagrammatic sectional view illustrating the manner of producing a novel lens employed in my invention.

10 indicates a suitable light source from which the light passes through an illuminating system to the film apertures, this system corresponding to the usual condenser system but constituted so as to illuminate all portions of both of the film apertures with equal intensity. For his purpose the lens element 11 of such system comprises two portions 11a and 11b as shown in Figure 3 each of which is composed of somewhat less than half of a complete lens, i. e., it is ground away a small distance beyond its optical center 11c. These lens portions are then united to form the composite lens element 11. 12 indicates a lens element which cooperates with the lens element 11 in focusing the light upon the adjacent film apertures 13a, 13b of the aperture plate 13. 14 indicates a usual or suitable shutter system which controls the passage of light to the film F which is operated between the rolls R, R', and 15 denotes a suitable lens system for focusing the projected light upon a screen.

By reason of the special construction of the composite lens element 11, each of the two portions 11a, 11b thereof directs a beam of light upon both film apertures, and these beams indicated by the characters X, Y, cross at the locality of the film apertures or somewhat beyond the same. It is to be noted that each of the beams X, Y as directed by the respective lens portions 11a, 11b is composed of rays which are directed in approximately parallel lines as they pass through the film apertures and that each of these beams covers the full extent of both apertures. From this it results that a substantially equal illumination of all parts of both of the film apertures 13a, 13b is effected, and thus no distortion will result from undue emphasis upon color values in different portions of the respective film images. In the form of the invention shown in Figure 1 the lens element 12 which cooperates with the element 11 is shown as a simple plano-convex lens while in Figure 2 a form is shown adapted for a different distance from the light source wherein the lens element 120 which similarly cooperates with the lens element 11, is composed of two portions 120a, 120b, each of which is ground away on one side, and then these portions united, these lens portions being not however ground away as far as the optical axes thereof.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having described my invention, what I claim is new and desire to secure by Letters Patent is:

1. Apparatus for double simultaneous projection comprising an aperture plate having two adjacent film apertures, a light source, and means for directing light from such light source upon said film apertures in two beams with all portions of each beam in approximate parallelism and with the beams superimposed one upon the other at the locality of the film apertures, each of which covers substantially the full extent of both apertures.

2. Apparatus for double simultaneous projection comprising an aperture plate having two adjacent film apertures, a light source, and means for directing light from such light source upon said film apertures in two beams with all portions of each beam in approximate parallelism and with the beams superimposed one upon the other at the locality of the film apertures, each of which covers substantially the full extent of both apertures and which beams cross at the locality of such apertures.

3. Apparatus for double simultaneous projection comprising a film plate having two adjacent film apertures, a light source, and means for directing light from such light source upon said apertures in two beams, each of which covers substantially the full extent of both apertures and with all portions of each beam projected upon the apertures in approximate parallelism.

4. Apparatus for double simultaneous projection comprising an aperture plate having two adjacent film apertures, a light source, and means for directing light from said light source upon said apertures in two beams with all portions of each beam in substantial parallelism and each lighting the full area of both film apertures, embodying a lens element composed of two convex lens portions each ground away beyond the optical axes thereof and united together.

5. Apparatus for double simultaneous projection comprising an aperture plate having two adjacent film apertures, a light source, and means for directing light from such light source upon said apertures in two beams with all portions of each beam in substantial parallelism and each lighting the full area of both film apertures, embodying a lens element composed of two portions each consisting of the remaining part of a plano-convex lens ground away beyond its optical center, each of such portions arranged to direct a beam of light upon substantially the entire extent of both apertures and with the beams from the two portions crossing at the locality of such apertures.

6. Apparatus as defined in claim 1 wherein the light directing means embodies a composite convex lens element for the purpose stated composed of two portions each ground away beyond its optical center.

7. Apparatus as defined in claim 1 wherein the light directing means embodies a composite plano-convex lens element for the purpose stated composed of two lens portions each ground away beyond its optical center thereof.

RICHARD THOMAS.